United States Patent
Li et al.

(10) Patent No.: US 11,070,514 B2
(45) Date of Patent: Jul. 20, 2021

(54) SYSTEM AND METHOD FOR DOMAIN NAME SYSTEM (DNS) SERVICE SELECTION

(71) Applicant: Verizon Patent and Licensing Inc., Arlington, VA (US)

(72) Inventors: Feng Li, Lexington, MA (US); Haim S. Ner, Fair Lawn, NJ (US); Parry Cornell Booker, Arlington, TX (US); Bjorn Olof Erland Kalderen, South Orange, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/567,245

(22) Filed: Sep. 11, 2019

(65) Prior Publication Data

US 2021/0075761 A1 Mar. 11, 2021

(51) Int. Cl.
*H04L 29/12* (2006.01)
*H04L 29/08* (2006.01)
*H04L 15/16* (2006.01)
*H04L 29/06* (2006.01)
*G06F 21/60* (2013.01)
*H04W 12/08* (2021.01)

(52) U.S. Cl.
CPC ........ *H04L 61/1511* (2013.01); *H04L 61/103* (2013.01); *H04L 61/1541* (2013.01); *H04L 67/18* (2013.01)

(58) Field of Classification Search
CPC ............. H04L 61/1511; H04L 61/1541; H04L 61/103; H04L 67/18

USPC ........................................................ 709/245
See application file for complete search history.

(56) References Cited

U.S. PATENT DOCUMENTS

| | | | |
|---|---|---|---|
| 7,533,108 B1* | 5/2009 | Shah | H04L 67/1021 |
| 7,555,542 B1* | 6/2009 | Ayers | H04W 4/02 |
| | | | 709/223 |
| 8,166,197 B2* | 4/2012 | Hoynowski | G06F 11/1443 |
| | | | 709/238 |
| 8,819,227 B1* | 8/2014 | Keralapura | H04L 45/38 |
| | | | 709/224 |
| 9,380,053 B1* | 6/2016 | Behnken | H04L 63/0853 |
| 9,756,019 B2* | 9/2017 | Warrick | H04L 63/0281 |
| 9,787,726 B2* | 10/2017 | Russell | H04L 65/1006 |
| 10,050,941 B2* | 8/2018 | Warrick | H04L 63/08 |
| 10,496,993 B1* | 12/2019 | Mulliner | G06Q 20/4016 |
| 2002/0010798 A1* | 1/2002 | Ben-Shaul | H04L 67/1021 |
| | | | 709/247 |
| 2005/0273668 A1* | 12/2005 | Manning | H04L 12/66 |
| | | | 714/39 |

(Continued)

OTHER PUBLICATIONS

"Use DNS Policy for Gee-Location Based Traffic Management with Primary Servers." Microsoft Docs. Accessed online https://docs.microsoft.com/en-us/windows-server/networking/dns/deploy/primary-secondary-geo-location; Sep. 11, 2019, 7 pages.

*Primary Examiner* — David R Lazaro
*Assistant Examiner* — Berhanu Shitayewoldetadik

(57) ABSTRACT

Methods, devices, and storage mediums select an edge network site over other candidate edge network sites, to resolve hostnames, from end devices, to Internet protocol addresses based on various network path information, over other factors, such as a proximity of the end device to the selected edge network site relative to the proximity to the other candidate edge network sites.

20 Claims, 6 Drawing Sheets

(56) References Cited

U.S. PATENT DOCUMENTS

| | | | |
|---|---|---|---|
| 2007/0058621 A1* | 3/2007 | Okmianski | H04L 61/1535 370/389 |
| 2007/0133041 A1* | 6/2007 | Tredoux | H04N 1/00233 358/1.15 |
| 2007/0177499 A1* | 8/2007 | Gavrilescu | H04L 43/0811 370/229 |
| 2008/0155093 A1* | 6/2008 | Dharmistan | H04L 43/0852 709/224 |
| 2008/0201401 A1* | 8/2008 | Pugh | H04L 29/12349 709/201 |
| 2009/0214009 A1* | 8/2009 | Schuman, Sr. | G16H 40/20 379/106.02 |
| 2010/0125673 A1* | 5/2010 | Richardson | H04L 45/741 709/239 |
| 2010/0128606 A1* | 5/2010 | Patel | H04L 43/0888 370/235 |
| 2010/0281364 A1* | 11/2010 | Sidman | G06F 16/284 715/713 |
| 2014/0059198 A1* | 2/2014 | Richardson | H04L 67/00 709/223 |
| 2014/0156806 A1* | 6/2014 | Karpistsenko | G06Q 50/28 709/219 |
| 2014/0162544 A1* | 6/2014 | Edge | H04W 4/029 455/3.01 |
| 2014/0162545 A1* | 6/2014 | Edge | H04W 28/06 455/3.01 |
| 2014/0162687 A1* | 6/2014 | Edge | H04H 20/08 455/456.1 |
| 2014/0162688 A1* | 6/2014 | Edge | H04L 12/1868 455/456.1 |
| 2014/0304414 A1* | 10/2014 | Yengalasetti | H04L 67/1036 709/226 |
| 2014/0344890 A1* | 11/2014 | Warrick | G06F 21/10 726/1 |
| 2014/0373107 A1* | 12/2014 | Mareschal | H04L 61/1511 726/4 |
| 2015/0207701 A1* | 7/2015 | Faaborg | H04W 4/023 709/224 |
| 2016/0359887 A1* | 12/2016 | Yadav | H04L 61/1511 |
| 2017/0019495 A1* | 1/2017 | Bennis | H04L 67/2842 |
| 2017/0118311 A1* | 4/2017 | Frydman | H04L 67/42 |
| 2017/0223053 A1* | 8/2017 | Dhanabalan | H04L 63/1408 |
| 2017/0310569 A1* | 10/2017 | Clemm | H04L 43/0858 |
| 2017/0366618 A1* | 12/2017 | Vrzic | H04L 67/148 |
| 2018/0019972 A1* | 1/2018 | Warrick | H04L 63/08 |
| 2018/0034860 A1* | 2/2018 | Russell | H04L 65/1069 |
| 2018/0124016 A1* | 5/2018 | Ong | H04L 61/1511 |
| 2018/0278679 A1* | 9/2018 | Sahin | G06F 9/5077 |
| 2019/0007375 A1* | 1/2019 | Warrick | H04L 61/1511 |
| 2019/0020620 A1* | 1/2019 | Byrne | H04L 61/1511 |
| 2019/0116153 A1* | 4/2019 | Deverakonda Venkata | H04L 67/02 |
| 2019/0141593 A1* | 5/2019 | Wei | H04W 24/02 |
| 2019/0190993 A1* | 6/2019 | Yoshikawa | H04L 12/66 |
| 2019/0220703 A1* | 7/2019 | Prakash | G06N 20/00 |
| 2019/0364492 A1* | 11/2019 | Azizi | H04W 52/0264 |
| 2019/0387062 A1* | 12/2019 | Enat | H04L 67/148 |
| 2020/0014591 A1* | 1/2020 | Ito | H04L 41/0813 |
| 2020/0014724 A1* | 1/2020 | Venkatasubramanian | H04L 61/1511 |
| 2020/0145699 A1* | 5/2020 | Hong | G06N 20/00 |
| 2020/0153927 A1* | 5/2020 | Asati | H04L 65/4084 |
| 2020/0178198 A1* | 6/2020 | Ding | G07C 5/008 |
| 2020/0213272 A1* | 7/2020 | Deverakonda Venkata | H04L 63/0823 |
| 2020/0229038 A1* | 7/2020 | Zhu | G06F 9/546 |
| 2020/0267518 A1* | 8/2020 | Sabella | H04W 48/16 |
| 2020/0273314 A1* | 8/2020 | Bordeleau | G08B 27/001 |
| 2020/0275357 A1* | 8/2020 | Bordeleau | H04W 48/18 |
| 2020/0275360 A1* | 8/2020 | Bordeleau | H04W 76/11 |
| 2020/0329008 A1* | 10/2020 | Dao | H04L 61/2007 |
| 2020/0336258 A1* | 10/2020 | Zhu | H04L 1/0076 |

* cited by examiner

| FQDN 310 | MEC IP 320 | LOCATION 330 | CRITERIA VALUE 340 | REF. COUNT 350 | TTL VALUE 360 |
|---|---|---|---|---|---|
| MEC SERVICE A | MEC SITE A1 | LOC. A1 | CVA1 | CA1 | TTLA1 |
| MEC SERVICE A | MEC SITE A2 | LOC. A2 | CVA2 | CA2 | TTLA2 |
| MEC SERVICE A | MEC SITE A3 | LOC. A3 | CVA3 | CA3 | TTLA3 |
| ... | ... | ... | ... | ... | ... |
| MEC SERVICE N | MEC SERVER N1 | LOC N1 | CVN1 | CN1 | TTLN1 |

# SYSTEM AND METHOD FOR DOMAIN NAME SYSTEM (DNS) SERVICE SELECTION

BACKGROUND

A Domain Name System (DNS) serves as the phonebook of the Internet and translates domain names to Internet protocol (IP) addresses so applications can locate and load Internet resources. Service providers are deploying multi-access edge computing (MEC), also known as mobile edge computing, whereby core network capabilities (e.g., computational, storage, etc.) are situated at different points in the network, including the network "edge" to reduce latency at an application service layer and to reduce data traffic at the core network.

DESCRIPTION OF THE DRAWINGS

FIG. 3 is a diagram illustrating exemplary database structure pertaining to an exemplary embodiment of the DNS;

DETAILED DESCRIPTION OF PREFERRED EMBODIMENTS

Figure 1:
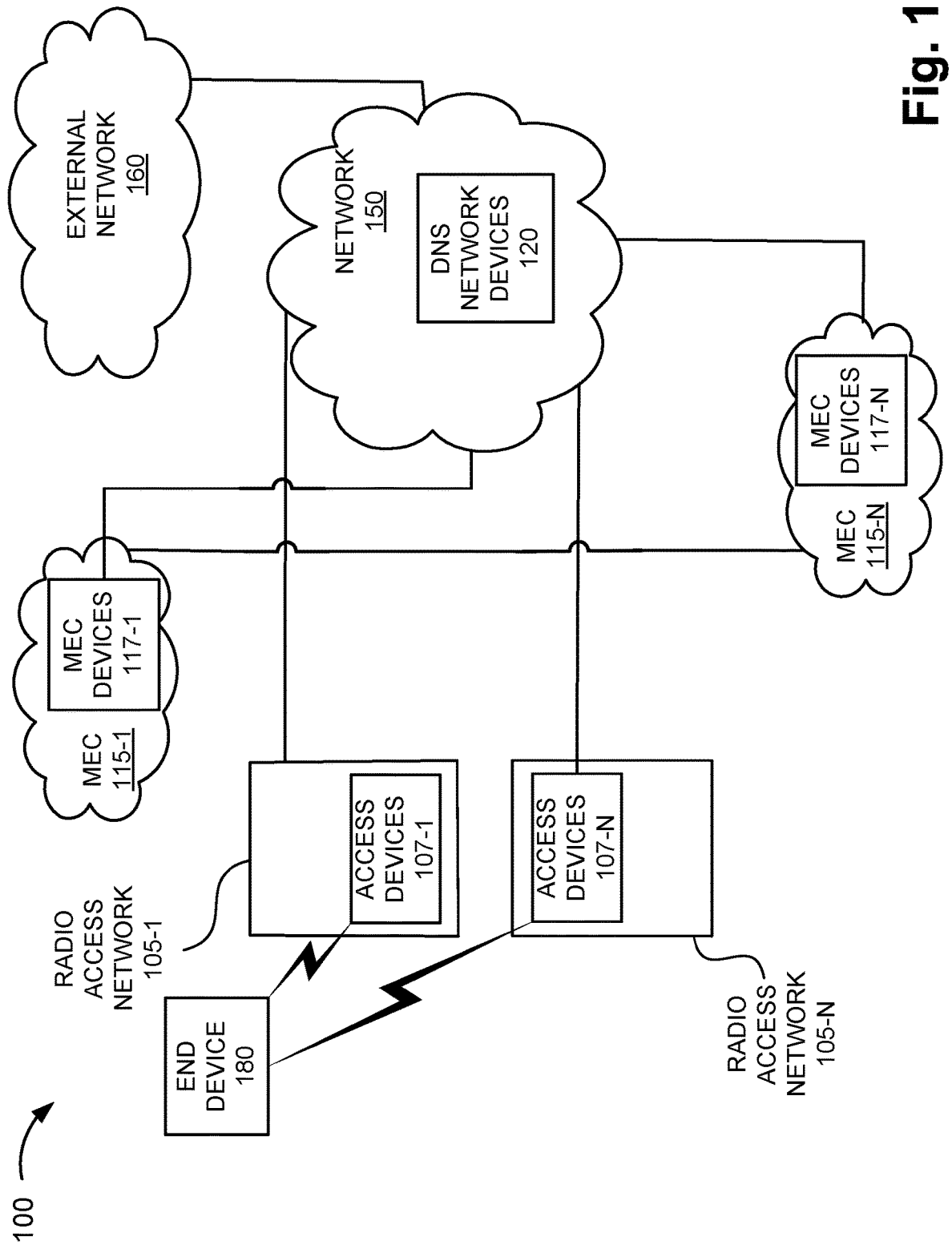
FIG. 1 is a diagram illustrating an exemplary environment in which an exemplary embodiment of a domain name system (DNS) may be implemented.

The following detailed description refers to the accompanying drawings. The same reference numbers in different drawings may identify the same or similar elements. Also, the following detailed description does not limit the invention.

The DNS delegates the responsibility of assigning domain names and mapping those names to Internet resources by designating authoritative name servers for each domain. With wide deployment of cloud services, network service providers introduced geolocation-based DNS service to resolve DNS queries according to the geolocation of the user device (or end device) and the application and/or service (referred to as "application service") to which the user device is attempting to connect, and provide the user device with the IP address of the closest available resources. MEC environments impose an enhanced requirement with respect to MEC site selections. For example, a user device is typically directed to the server that is executing on the edge network and physically closer to the user device. Accordingly, MEC application services with real-time requirements are better able to meet the low latency requirements due to the user device being connected to the closest server.

In some circumstances, the geolocation-based DNS policy may not result in optimal service in MEC environments. For example, the typical geolocation approach may require user devices to be grouped by subnets, such that the user devices in a given "locale" use a same subnet (or IP pool). Thus, the user devices from a relatively expansive "locale" (e.g., the state of Texas) may share the same subnet. In a MEC environment, the application service may be deployed close to the edge network, and a data center may not be in a region level (or service zone). The MEC site may be located near an access point (e.g., eNodeB) or the provider's central office. Accordingly, technological challenges presented by current MEC environments involve the optimal selection of MEC resources for providing a requested application service to user devices that are dispersed throughout a wide-ranging geographic area.

Technological solutions to the above-described challenges involve recognizing that a user device's geographic proximity to a MEC site does not necessarily guarantee the user device's proximity to the MEC site in "network path distance." Due to network topology, for example, the nearest physically situated MEC site may not be the nearest MEC site in terms of "network distance" (e.g., round trip time (RTT)). That is, MEC server sites that are further geographically from a user device may nevertheless provide a connection having lower latency and/or higher capacity (e.g., bandwidth). This quality of service issue is even more evident post-deployment of MEC networks.

According to an exemplary embodiment, a DNS provides Hostname-to-IP address translations in which the IP addresses correlate to one or multiple network path criteria. That is, an IP address corresponds to a network address for accessing edge network resources (e.g., an application service) associated with the hostname. Hostnames may be a sequence of characters that identifies a logical or physical host. For example, a criterion may pertain to the type of quality-of-service metric (e.g., network latency, capacity, etc.) and/or some other type of criterion that is associated with a network path (or network path segment) to each candidate edge network site.

According to an exemplary embodiment, the DNS may communicate with an Application-Layer Traffic Optimization (ALTO) server and use ALTO information to provide a Hostname-to-IP address translation. The ALTO information may include information pertaining to network path performance characteristics such as maximum bandwidth, round trip time, reference counts, etc. According to such an embodiment, a network element of the DNS includes an ALTO client to obtain ALTO-related information from an ALTO server device. According to an exemplary embodiment, the DNS includes a DNS policy that may be implemented within a name server. The DNS policy device may dynamically create and store DNS policies using the network path information, for example, obtained from the ALTO client.

According to an exemplary embodiment, a DNS client associated with a user device generates and transmits a DNS query to the DNS, for example, co-located with a packet gateway (PGW), a user plane function (UPF), or other network device. The DNS includes data or information pertaining to one or multiple network pathway criteria. According to an exemplary embodiment, an intermediary device, which is located between the DNS and the DNS client, generates and transmits a DNS query. According to an exemplary embodiment, the DNS obtains data or information, in response to receiving a DNS query, which is used to perform a Hostname-to-IP address translation.

FIG. 1 is a diagram illustrating an exemplary environment 100 in which an exemplary embodiment of the DNS selection service may be implemented. As illustrated, environment 100 includes radio access networks (RANs) 105-1 through 105-N (also referred to collectively as RANs 105, or individually or generally as RAN 105), MEC network sites or clusters 115-1 through 115-N (also referred to collectively as MEC sites 115, or individually or generally as MEC site 115), a network 150, and an external network 160. RAN 105 includes access devices 107-1 through 107-N; MEC networks 115 include MEC devices 117-1 through 117-N; and network 150 includes DNS network devices 120. Environment 100 further includes end device 180.

The number, the type, and the arrangement of devices in environment 100, as illustrated and described, are exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

The number, the type, and the arrangement of networks in environment 100, as illustrated and described, are exemplary. According to an exemplary embodiment, as described herein, environment 100 includes multiple MEC networks (e.g., MEC sites 115). According to an exemplary implementation, the multi-site MEC network includes MEC networks 115 deployed at different proximities to the edge network, for example, of a service provider's network.

Environment 100 includes communication links between various network devices, between end device 180 and various network devices, and, for example, between MEC sites 115 and external network 160. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the DNS selection service may use at least one of these planes of communication. Additionally, an interface of a network device may be modified relative to a standard interface (e.g., an interface defined by a standards body, such as Third Generation Partnership Project (3GPP), International Telecommunication Union (ITU), European Telecommunications Standards Institute (ETSI), etc.) in order to support the communication (e.g., transmission and reception of messages, information elements (IE), attribute value pairs (AVPs), etc.) between network devices and the DNS selection service, as described herein. According to various exemplary implementations, the interface may be a service-based interface or a reference point-based interface.

RAN 105 may include one or multiple networks of one or multiple types and technologies. For example, RAN 105 may include a Fourth Generation (4G), a 4.5G, a Fifth Generation (5G), and/or another type of future generation RAN. By way of further example, RAN 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. RAN 105 may further include other types of wireless networks, such as a WiFi network, a Worldwide Interoperability for Microwave Access (WiMAX) network, a local area network (LAN), or another type of network that may provide an on-ramp to another network.

According to various exemplary embodiments, RAN 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, RAN 105 may be implemented according to various wireless technologies (e.g., radio access technology (RAT), etc.), wireless standards, wireless frequencies/bands, and so forth.

RAN 105 may include different and multiple functional splitting, such as options 1, 2, 3, 4, 5, 6, 7, or 8, plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

Depending on the implementation, RAN 105 may include one or multiple types of access devices 107. For example, access devices 107 may be implemented to include an eNB, a gNB, an eLTE eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service.

MEC networks 115 include multiple networks of one or multiple network types and technologies. MEC networks 115 provide access and use of services and applications by end device 180. According to an exemplary embodiment, MEC networks 115 are deployed at different proximities to the edge network (e.g., relative to end devices 180). According to an exemplary implementation, MEC network 115 may be co-located to access devices 107 of a particular geographic region within RAN 105, co-located to network devices of a backhaul network (not shown), and/or co-located to core devices of network 150. In view of this architecture, MEC network 115 co-located to access devices 107 may offer a lower latency than both MEC network 115 co-located to the network devices of the backhaul network, and MEC 150 co-located to network 150.

MEC network 115 may be implemented using one or multiple technologies including, for example, SDN, network function virtualization (NFV), cloud computing, Infrastructure-as-a-Service (IaaS), Platform-as-a-Service (PaaS), Software-as-a-Service (SaaS), or another type of network technology. Depending on the implementation, MEC network 115 may include, for example, virtualized network functions (VNFs), multi-access (MA) applications/services, and/or servers that provide application services for use by end device 180. MEC network 115 may also include other types of network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices, network resources (e.g., storage devices, communication links, etc.). MEC network 115 may further include network devices that provide core network functionalities (e.g., functions associated with DNS network devices 120, as described herein). For purposes of illustration and description, MEC devices 117 may include the various types of network devices that may be resident in MEC network 115, as described herein.

Network 150 may include one or multiple networks of one or multiple network types and technologies. Network 150 may include a complementary network to RAN 105. For example, network 150 may be implemented to include an Evolved Packet Core (EPC) of an LTE, an LTE-A network, an LTE-A Pro network, a next generation core (NGC) network, and/or a legacy core network. Depending on the particular implementation, network 150 may include various network devices, such as for example, an MME, a PGW, a SGW, a PDU session anchor UPF (PSA-UPF), a network data analytics function (NWDAF), a home subscriber server (HSS), an authentication, authorization, and accounting (AAA) server, a policy and charging rules function (PCRF), a charging system (CS), a UPF, an AMF, a SMF, a unified data management (UDM) device, an authentication server function (AUSF), a network slice selection function (NSSF), a network repository function (NRF), a policy control function (PCF), a network exposure function (NEF), as well as others not particularly described herein. According to other exemplary implementations, network 150 may include additional, different, and/or fewer network devices than those described.

Figure 2:
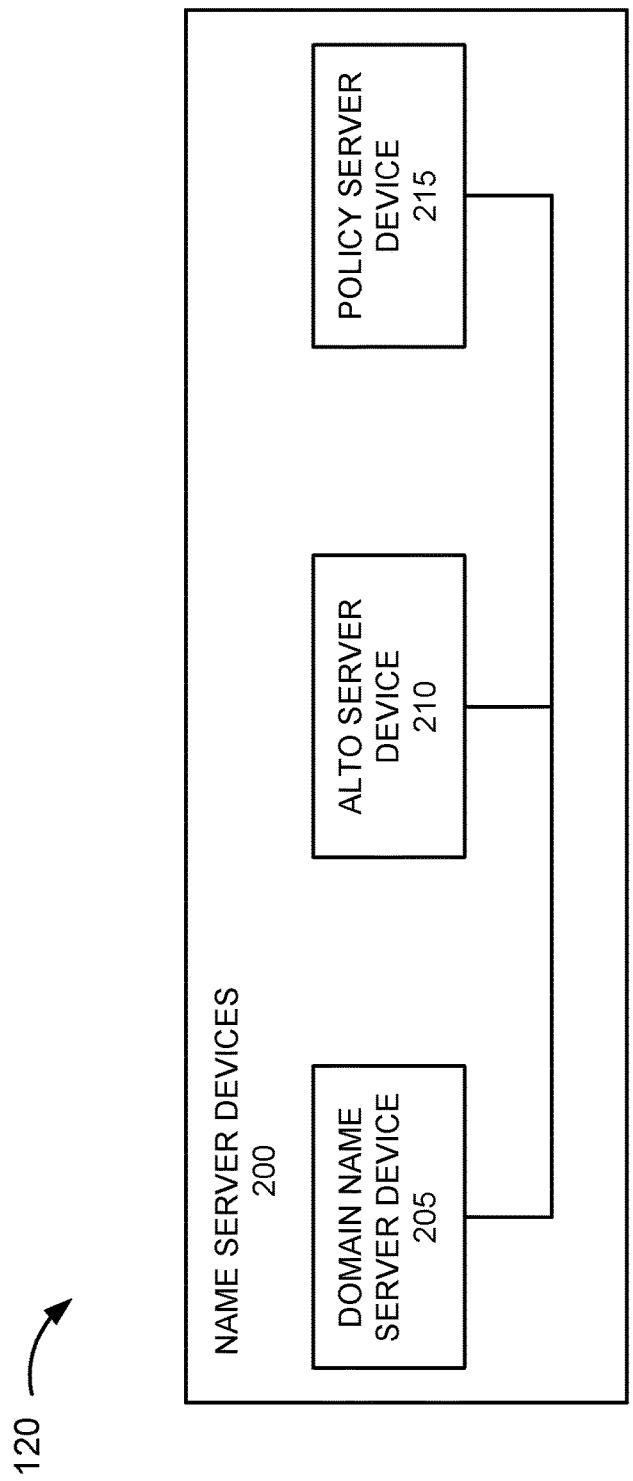
FIG. 2 is a diagram illustrating exemplary network elements of the DNS depicted in FIG. 1.

DNS network devices 120 may include various types of network devices that may be resident in network 150, as shown in FIG. 2 and described herein. DNS network devices 120 include network devices that perform Hostname-to-IP translation. According to an exemplary embodiment, DNS network devices 120 include an ALTO server device, a policy server device, and a name server device. DNS network devices 120 may adopt the hierarchical nature of a conventional or well-known DNS architecture. According to an exemplary implementation, DNS network devices 120 may use the DNS protocol in which available fields (e.g., a reserved field, etc.) in various DNS messages may be used to include criterion data or information pertaining to a process described herein. According to another exemplary implementation, DNS network devices 120 may use a modified DNS protocol.

External network 160 may include one or multiple networks of one or multiple types and technologies. For example, external network 160 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services. Depending on the implementation, external network 160 may include various network devices (not shown) that provide various applications, services, or other type of end device assets, such as servers (e.g., web, application, cloud, etc.), mass storage devices, data center devices, and/or other types of network devices pertaining to various network-related functions.

End device 180 may be implemented as a mobile device, a portable device, a stationary device, a device operated by a user, or a device not operated by a user (e.g., an autonomous device). For example, end device 180 may be implemented as a Mobile Broadband device, a smartphone, a computer, a tablet, a netbook, a phablet, a wearable device, a vehicle support system, a game system, a drone, an IoT device, an enhanced MTC device (eMTC) (also known as Cat-M1), a NarrowBand IoT (NB-IoT) device, or some other type of wireless device (e.g., a set top box, a smart television, a music playing device, etc.). According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, etc.

End device 180 includes a device having the capability to communicate with DNS network devices 120. According to an exemplary embodiment, end device 180 includes a DNS client resolver. The DNS client resolver communicates with DNS network devices 120. For example, the DNS client resolver generates DNS queries or DNS requests for Hostname-to-IP address resolutions. According to an exemplary implementation, the DNS client resolver includes one or multiple criteria in a DNS query or request.

According to other embodiments, one or more functions and/or processes described as being performed by a particular device may be performed by a different device, or some combination of devices, which may or may not include the particular device.

FIG. 2 is a diagram illustrating exemplary network elements of the DNS network devices 120 depicted in FIG. 1. As illustrated, DNS network devices 120 include a domain name server device 205, an ALTO server device 210, and a policy server device 215 (also referred to collectively as name server devices 200). The number of network elements and the configuration are exemplary. According to other embodiments, the DNS may be implemented with additional, fewer, or different network elements.

Domain name server device 205, ALTO server device 210, and policy server device 215 provide a DNS service that includes Hostname-to-IP address translation. The DNS service may offer other services, such as, for example, dynamically creating new sub-domains based on policies, as well as other services, as described herein. According to an exemplary implementation, domain name server device 205, ALTO server device 210, and policy server device 215 store DNS records that provide a DNS service. For example, a DNS record may include one or multiple criteria fields that identify one or multiple criteria correlated or mapped to an IP address. According to another implementation, a set of resource records that share a common criterion are stored together.

Domain name server device 205 includes a network device that provides Hostname-to-IP address translation and other services, as described herein. ALTO server device 210 includes a network device that provides network path information. For example, referring to FIG. 3, ALTO server device 210 may store a file 300 that includes a list of application service names 310 associated with MEC resources, MEC IP addresses 320 for the MEC resources, location information 330 that indicates a geolocation of MEC sites 115, network path criteria values 340 for network paths (or path segments) to MEC sites 115, network path reference counts 350 for network paths (or path segments) to MEC sites 115, time-to-live (TTL) values 360 for updating the network path criteria values, etc.

The DNS service may store resource records that allow the DNS to perform Hostname-to-IP address translations based on one or multiple network path criteria. According to an exemplary implementation, resource records include one or multiple fields that indicate one or multiple network path criteria to which the resource records pertain. According to another implementation, a database that stores resource records is structured or organized based on one or multiple network path criteria to which the resource records pertain. For example, a set of resource records that share a common network path criterion are stored together. Although FIG. 3 shows exemplary fields for file 220 data, in other implementations, recorded data may include different, differently arranged, fewer, or additional fields than those depicted in FIG. 3.

Returning to FIG. 2, as previously described, the DNS (e.g., DNS network devices 120) implemented by domain name server device 205, ALTO server device 210, and policy server device 215 provide a DNS service. According to an exemplary embodiment, the DNS uses criterion information to resolve to a record, and in turn, resolve to an IP address. For example, a criterion may pertain to a type of content, a type of application, a type of device, a level of security, a quality-of-service metric, some combination thereof, or some other criterion configurable by a DNS service provider.

According to an exemplary embodiment, the DNS service uses ALTO information to resolve a hostname to an IP address. The ALTO information may include information pertaining to maximum bandwidth, network latency, reference counts, or another type of performance, service level agreement (SLA), and/or quality of service (QoS) metric. According to such an embodiment, domain name server device 205 includes an ALTO client that generates an ALTO query that includes, among other things, a set of destination network locations and an ALTO "cost" type (e.g., latency, capacity, etc.). Upon receiving an ALTO response, domain name server device 205 may select an IP address, according to DNS policies retrieved from policy server device 215, based on a ranking or a numerical value associated with a "cost" given source and destination addresses.

According to an exemplary embodiment, the DNS service uses DNS policies to resolve a hostname to an IP address. According to an exemplary implementation, policy server device 215 includes a DNS policy device. Described below are some exemplary scenarios relating to the use of DNS policies.

Figure 4:
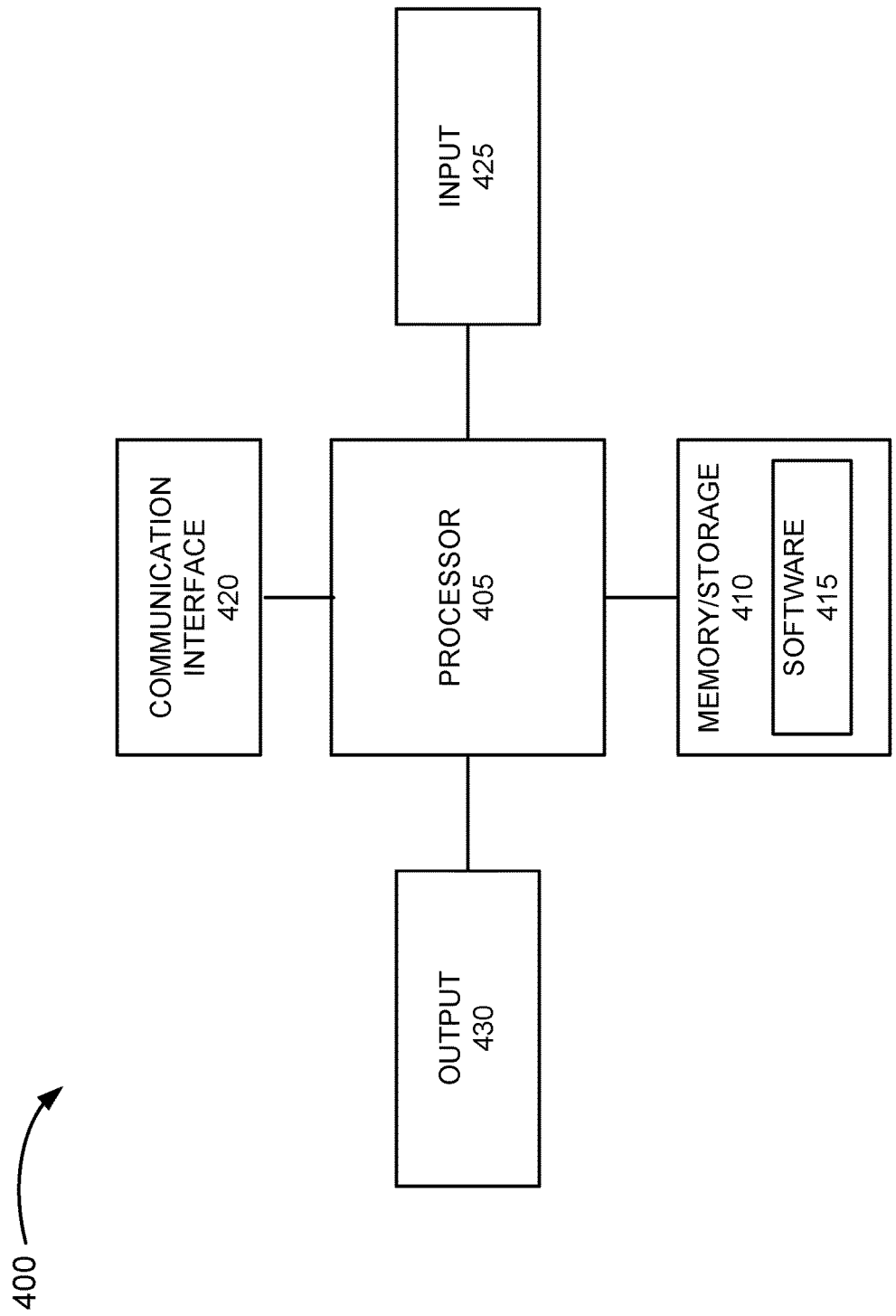
FIG. 4 is a diagram illustrating exemplary components of a device that may correspond to one or more of the devices depicted in the previous figures.

FIG. 4 is a diagram illustrating exemplary components of a device 400 that may correspond to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, domain name server 205, root name server 210, and authoritative name server 215 may be implemented with one or more program(s) and/or application(s). Additionally, for example, other devices (e.g., user device 130) may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a keypad, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (e.g., processor 405).

Figure 5:
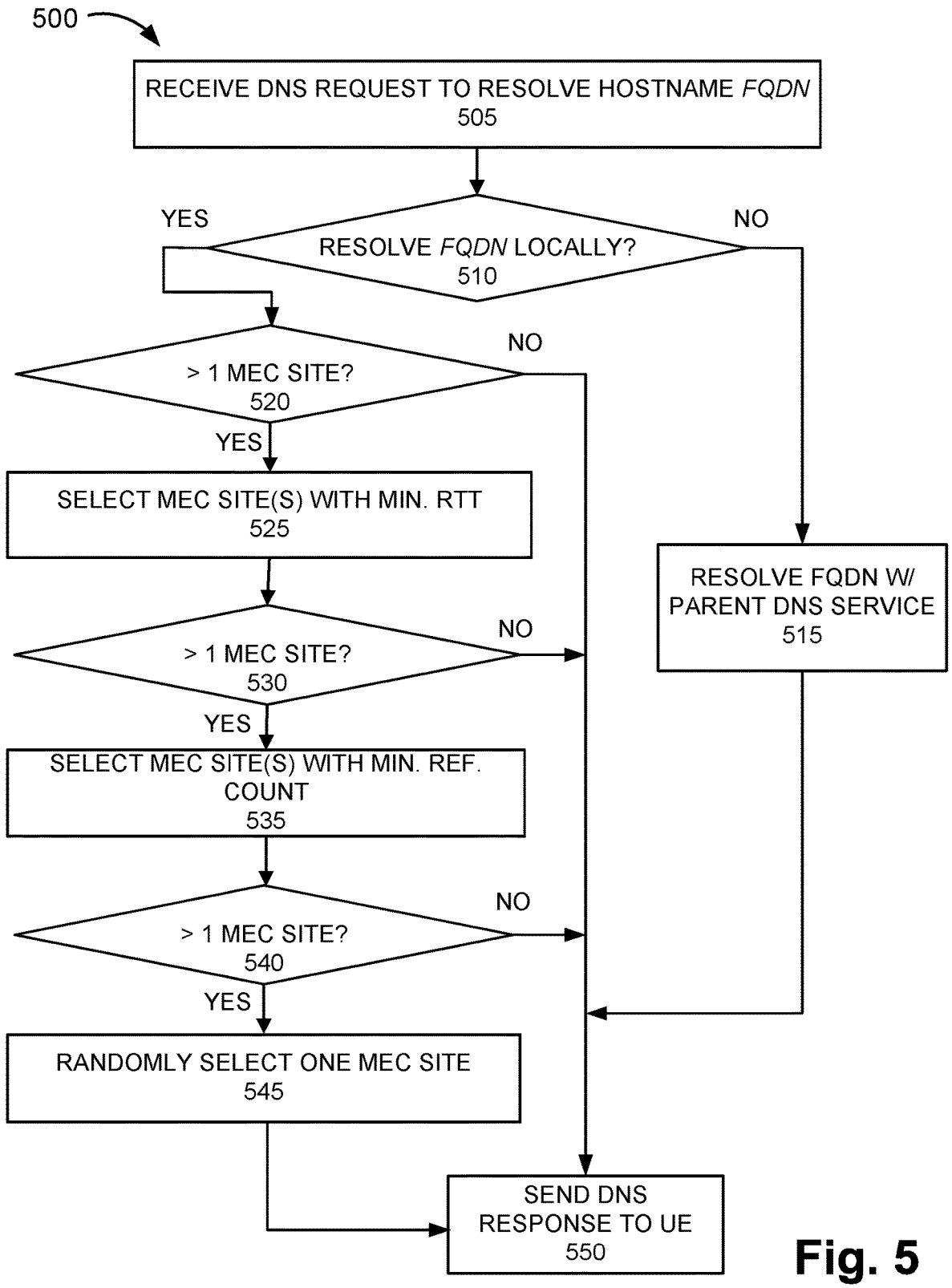
FIG. 5 is a flow diagram illustrating an exemplary process for resolving a hostname (e.g. a Fully Qualified Domain Name (FQDN)) to an IP address based on one or multiple criteria.

FIG. 5 is a flow diagram illustrating an exemplary process 500 for resolving a hostname (e.g., a fully qualified domain name (FQDN)) to an IP address based on network path criteria according to an exemplary embodiment of the DNS selection service. Table 1 below illustrates exemplary pseudocode that may be used to implement one or more steps or acts described in process 500 by DNS network devices 120 illustrated in FIGS. 1 and 2. For example, a step or an act of process 500 may be performed by domain name server device 205, ALTO server device 210, and/or policy server device 215 in which processor 405 executes software 415 to perform the step or the act described. For purposes of description, process 500 is described in relation to domain name server device 205.

resolved using a local database (block 510—NO) (e.g., Table 1, line 3), in block 515 the FQDN may be resolved using a parent DNS service (e.g., Table 1, line 4). In block 550, results from the parent DNS may be sent in a DNS response to user device 180 (e.g., Table 1, line 5).

Alternatively, if the FQDN can be resolved using a local database (block 510—YES), in block 520, it is determined whether one or multiple candidate MEC sites 115 provide the network resources corresponding to the FQDN. If only one MEC site 115 is identified (block 520—NO), then in block 550 domain name server device 205 may send a DNS response to user device 180 with an IP address corresponding to the identified MEC site 115. A reference count 350 of file 300 associated with the identified MEC site 115 may be increased by one.

Alternatively, if multiple MEC sites 115 are identified (block 520—YES), then in block 525, domain name server device 205 may select MEC sites 115 based on network path criteria associated with each MEC site 115. For example, domain name server device 205 may obtain ALTO information corresponding to criteria values 340 from file 300 stored in ALTO server device 210 for each candidate MEC site 115 for providing the MEC application service corresponding to the FQDN (e.g., Table 1, line 7). For example, domain name server device 205 may apply a DNS policy provided by policy server device 210 that identifies RTT values as the network path criteria to be used in selecting the "nearest" available MEC sites 115. In one embodiment, MEC sites 115 having an RTT value below a threshold RTT value (e.g., about 20 ms or other time value), may be selected. In another embodiment, MEC sites 115 having an RTT value within a range of RTT values (e.g., about 1-10 ms or other time

TABLE 1

NETWORK PATH CRITERIA-BASED NETWORK NAME RESOLUTION

```
 1: PROCEDURE UPON EACH DNS REQUEST (FQDN)
 2:     C ← resolve_name_local(local, FQDN)
 3:     If |C| = then                                    ▶ Could not resolve FQDN with local database,
 4:         candidate ← resolve_name(parent, FQDN)       ▶ resolve with parent DNS server
 5:         return candidate
 6:     end if
 7:     C ← select_server_with_min_RTT(C)
 8:     if |C| = 1 then                                  ▶ Only one candidate
 9:         choose the "nearest" server with lowest latency.
10:         candidate ← C
11:         candidate.reference ← candidate.reference + 1  ▶ increase reference count by 1
12:         return candidate
13:     end if
14:     C ← select_server_with_min_load(C)
15:     if |C| = 1 then                                  ▶ Only one candidate
16:         choose the "nearest" server with least load.
17:         candidate ← C
18:         candidate.reference ← candidate.reference + 1  ▶ increase reference count by 1
19:         return candidate
20:     end if
21:     candidate ← random_choose_one(C)   ▶ multiple candidate servers remain, choose 1
22:     candidate.reference ← candidate.reference + 1     ▶ increase reference count by 1
23:     return candidate
24: end procedure
```

Process 500 begins, in block 505, with a DNS request to resolve hostname FQDN being received at a domain name system. For example, a DNS client resolver of user device 180 generates and transmits a DNS query that is received, for example, at domain name server device 205.

In block 510, an attempt is made to resolve the FQDN locally. For example, domain name server device 205 may determine whether the FQDN can be resolved using a local database (e.g., Table 1, line 2). If the FQDN cannot be range) may be selected. In other embodiments, MEC sites 115 having the lowest RTT value are selected.

In block 530, it is determined whether one or multiple MEC sites 115 are selected based on the applied policy regarding network path criteria (e.g., RTT values). When only one candidate MEC site 115 is selected (block 530—NO) (e.g., Table 1, lines 8-9), then in block 550 domain name server device 205 sends a DNS response to user device 180 with an IP address corresponding to the selected MEC site 115. A reference count 350 of file 300 associated with the selected MEC site 115 may be incremented by one (e.g., Table 1, line 11).

Alternatively, when multiple candidate MEC sites 115 are identified, (block 530—YES), then in block 535, domain name server device 205 may select MEC sites 115 based on a load associated with each candidate MEC site 115. For example, domain name server device 205 may obtain ALTO information corresponding to reference counts 350 from file 300 stored in ALTO server device 210 for each candidate MEC site 115 for providing the application service corresponding to the FQDN (e.g., Table 1, line 14).

In block 540, it is determined whether one or multiple MEC sites 115 are selected based on the applied policy regarding network path load (e.g., reference counts). When only one candidate MEC site 115 is selected (block 540—NO) (e.g., Table 1, lines 15-16), then in block 650 domain name server device 205 sends a DNS response to user device 180 with an IP address corresponding to the selected MEC site 115. A reference count 350 of file 300 associated with the selected MEC site 115 may be incremented by one (e.g., Table 1, line 18).

Alternatively, when multiple candidate MEC sites 115 are selected, (block 540—NO), then in block 545, domain name server device 205 may randomly select a MEC site 115 from among the candidate MEC sites 115 (e.g., Table 1, line 21). In block 550 domain name server device 205 sends a DNS response to user device 180 with an IP address corresponding to the randomly selected MEC site 115. A reference count 350 of file 300 associated with the selected MEC site 115 may be incremented by one (e.g., Table 1, line 22).

Although FIG. 5 illustrates an exemplary process 500 for resolving a hostname to an IP address based on network path criteria, process 500 may include additional operations, fewer operations, and/or different operations than those illustrated in FIG. 5 and described herein. Additionally, or alternatively, process 500 may use different criteria other than or in addition to RTT and reference count.

Figure 6:
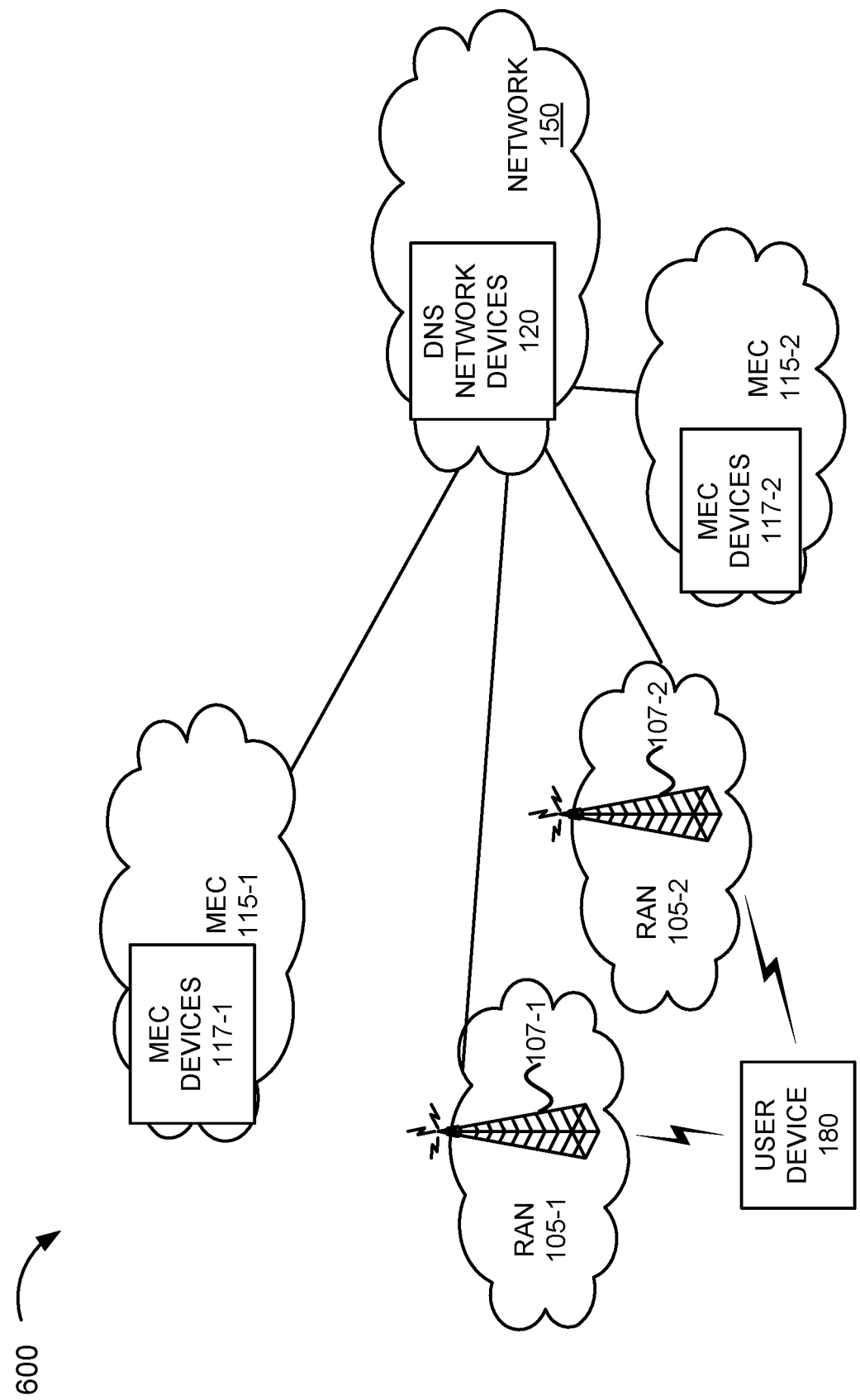
FIG. 6 is a flow diagram illustrating an exemplary scenario for resolving a hostname to an IP address based on DNS policies.

FIG. 6 is a diagram illustrating an exemplary environment 600 in which a network statistics-based DNS server-selection scheme may be implemented in a MEC network environment 600. According to an exemplary scenario, assume that topologically, user device 180 is closer in physical proximity to MEC site 115-2. Under a UE IP pool-based approach, or under a geo-distance-based approach, DNS network devices 120 would select MEC site 115-2 in response to a DNS query received from user device 180 requesting MEC resources. These conventional approaches would not use any other network path criteria related to MEC site 115-1 or MEC site 115-2.

According to the exemplary scenario, DNS network devices 120 receives a DNS query, and policy server device 215 identifies a DNS policy that indicates network path criteria to use for selection of a MEC site 115 to provide the resources corresponding to the DNS query. According to an exemplary implementation, the policy may cause ALTO server device 215 to retrieve the identified network path criteria (e.g., end-to-end network latency) from resource records. For example, the DNS policy may indicate that RTT values obtained for MEC site 115-1 and MEC site 115-2 are to be compared. Domain name server device 205 may determine, for example, that an RTT value for MEC site 115-1 is better (i.e., shorter) than an RTT value for MEC site 115-2. In this case, domain name server device may identify MEC site 115-1 as being "nearer" to user device 180. In this scenario, domain name server device 205 would generate and send a DNS response to user device 180 including a corresponding IP address.

On the other hand, domain name server device 205 may determine that the RTT values are the same or substantially the same (i.e., different by an insignificant amount or within a designated range). According to the applicable DNS policy under the exemplary scenario, the next network path criterion to be compared is network load. For example, the DNS policy from policy server device 215 may indicate that reference counts associated with MEC site 115-1 and MEC site 115-2 and retrieved from ALTO server device 210 are to be compared.

Domain name server device 205 may determine that a reference count for MEC site 115-1 is less than a reference count for MEC site 115-2. Based on the comparison, domain name server device 205 may determine that the network path from user device 180 to MEC site 115-1 is "shorter" than the network path to MEC site 115-2. Accordingly, domain name server 205 may generate and transmit a DNS response to user device 180 including an IP address for providing the requested network resources.

On the other hand, domain name server device 205 may determine that the reference counts values are the same or substantially the same (i.e., different by an insignificant amount or within a designated range). According to the applicable DNS policy under the exemplary scenario, domain name server device 205 may make a random selection between MEC site 115-1 and MEC site 115-2, and send a DNS response to user device 180 that corresponds to the selection. In other exemplary scenarios, DNS policy use other network path criteria (e.g., network capacity) before a random selection is made.

Table 2 below illustrates exemplary pseudocode containing some of the steps or acts for updating one type network path criteria that may be used in a network statistics-based DNS server selection scheme in a MEC network environment. For example, name server devices 200 may, at predetermined times, send out pings to MEC sites 115 to obtain RTT values. This information may be recorded resource information. Other data collection schemes may be implemented. In one embodiment, other types of network path information may be obtained.

TABLE 2

| UPDATING NETWORK PATH LATENCY |  |
|---|---|
| 1: | Procedure ON EVERY EPOCH TIME |
| 2: | for each MEC site entry in local database do |
| 3: | server.TTL ← server.TTL − 1 |
| 4: | if server.TTL = 0 then |
| 5: | Start ping towards server, to measure RTT |
| 6: | if ping failed with server then |
| 7: | RTT ← ∞ |
| 8: | end if |
| 9: | server.RTT ← RTT |
| 10: | server.reference ← 0 |
| 11: | server.TTL ← $TTL_{init}$ |
| 12: | end if |
| 13: | end for |
| 14: | end procedure |

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. For example, according to other exemplary embodiments, the packet inspection service may be implemented on end device 180.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 405, etc.), or a combination of hardware and software (e.g., software 415).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single or multiple physical memory or storage devices that reside(s) in or is accessible to one or multiple devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a name server device, a domain name system (DNS) request from an end device to resolve a hostname to an Internet Protocol (IP) address associated with an application service;
    determining, by the name server device, that the hostname can be resolved using a local database;
    determining, by the name server device, that the application service is available from multiple multi-access edge computing (MEC) networks that are not a closest MEC network in physical proximity to the end device;
    determining, by the name server device, a first network path criteria value for each of the multiple MEC networks associated with a network path segment between the name server device and each of the multiple MEC networks;
    selecting, by the name server device, a set of first MEC networks from the multiple MEC networks based on the first network path criteria values that are within a first range of values;
    determining, by the name server device, a second network path criteria value for each of the first MEC networks associated with the network path segment between the name server device and each of the first MEC networks;
    selecting, by the name server device, a second MEC network from among the first MEC networks based on the second network path criteria value;
    resolving, by the name server device, the hostname to the IP address based on the second MEC network;
    generating, by the name server device, a DNS response that includes the resolved IP address; and transmitting, by the name server device, the DNS response to the end device.

2. The method of claim 1, wherein the hostname comprises a fully qualified domain name (FQDN).

3. The method of claim 1, wherein the first network path criteria value comprises a round trip time (RTT) value.

4. The method of claim 1, further comprising:
determining a physical distance between the end device and each of the first MEC networks, wherein the physical distance determined for each of the first MEC networks is equal to or greater than the physical distance determined for at least one other first MEC network.

5. The method of claim 1, wherein selecting the second MEC network comprises selecting the second MEC network over at least one other first MEC network based on a first reference count value associated with the second MEC network and a second reference count value associated with the at least one other first MEC network.

6. The method of claim 1, further comprising:
identifying, by the name server device, a policy to be used for resolving the hostname to the IP address.

7. The method of claim 6, further comprising:
updating, at predetermined time intervals based on the policy, the first network path criteria values; and
updating the policy based on the updated first network path criteria values.

8. The method of claim 6, further comprising:
updating, based on the selecting, the policy with respect to a reference count value associated with the second MEC network.

9. A network device, comprising:
a communication interface;
a memory to store instructions; and
a processor to execute the instructions to:
receive, via the communication interface, a domain name system (DNS) request from an end device to resolve a hostname to an Internet Protocol (IP) address associated with an application service;
determine that the hostname can be resolved using a local database;
determine that the application service is available from multiple multi-access edge computing (MEC) network that are not a closest MEC network in physical proximity to the end device;
determine a first network path criteria value for each of the multiple MEC networks associated with a network path segment between the name server device and each of the multiple MEC networks;
select a set of first MEC networks from the multiple MEC networks based on the first network path criteria values that are within a first range of values;
determine a second network path criteria value for each of the first MEC networks associated with the network path segment between the name server device and each of the first MEC networks;
select a second MEC network from among the first MEC networks based on the second network path criteria value;
resolve the hostname to the IP address based on the second MEC network;
generate a DNS response that includes the resolved IP address; and
transmit, via the communication interface, the DNS response to the end device.

10. The network device of claim 9, wherein the first network path criteria value comprises a round trip time (RTT) value.

11. network device of claim 9, wherein the processor further executes the instructions to:
determine a physical distance between the end device and each of the first MEC networks, wherein the physical distance determined for the second MEC network is equal to or greater than the physical distance determined for at least one other first MEC network.

12. The network device of claim 11,
wherein to select the second MEC network the processor further executes the instructions to select the second MEC network over at least one other first MEC network based on a first reference count value associated with the second MEC network site and a second reference count value associated with the at least one other first MEC network.

13. The network device of claim 11, wherein the processor further executes the instructions to identify a policy to be used for the resolution of the hostname to the IP address.

14. The network of claim 13, wherein the processor further executes the instructions to:
update, at predetermined time intervals based on the policy, the first network path criteria values; and
update the policy based on the updated first network path criteria values.

15. The network of claim 13, wherein the processor further executes the instructions to:
update, based on the selection, the policy with respect to a reference count value associated with the second MEC network.

16. A non-transitory storage medium storing instructions executable by a computational device, wherein the instructions comprise instructions to:
receive, via the communication interface, a domain name system (DNS) request from an end device to resolve hostname to an Internet Protocol (IP) address associated with an application service;
determine that the hostname can be resolved using a local database;
determine that the application service is available from multiple multi-access edge computing (MEC) networks that are not a closest MEC network in physical proximity to the end device;
determine a first network path criteria value for each of the multiple MEC networks associated with a network path segment between the name server device and each of the multiple MEC networks;
select a set of first MEC networks from the multiple MEC networks based on the first network path criteria values that are within a first range of values;
determine a second network path criteria value for each of the first MEC networks associated with the network path segment between the name server device and each of the first MEC networks;
select a second MEC network from among the first MEC networks based on the second network path criteria value;
resolve the hostname to the IP address based on the second network;
generate a DNS response that includes the resolved IP address; and
transmit, via the communication interface, the DNS response to the end device.

17. The non-transitory storage medium of claim 16, wherein the first network path criteria value comprises a round trip time (RTT) value.

18. The non-transitory storage medium of claim 16, wherein the instructions comprise further instructions to:
   determine a physical distance between the end device and each of the first MEC networks, wherein the physical distance determined for the second MEC network is equal to or greater than the physical distance determined for at least one other first MEC network.

19. The non-transitory storage medium of claim 16,
   wherein the instructions to select the second MEC network comprise further instructions to select the second MEC network over the at least one other first MEC network based on a first reference count value associated with the second MEC network and a second reference count value associated with the at least one other first MEC network.

20. The non-transitory storage medium of claim 16, further comprising instructions to:
   identify a policy to be used for the resolution of the hostname to the IP address;
   update, at predetermined time intervals based on the policy, the first network path criteria values;
   update the policy based on the updated first network path criteria values; and
   update, based on the selection, the policy with respect to a reference count value associated with the first MEC network.

* * * * *